United States Patent
Idaka

(10) Patent No.: US 11,838,638 B2
(45) Date of Patent: Dec. 5, 2023

(54) CONTROL APPARATUS AND CONTROL METHOD OF THE SAME

(71) Applicant: CANON KABUSHIKI KAISHA, Tokyo (JP)

(72) Inventor: Sayuri Idaka, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 1 day.

(21) Appl. No.: 17/580,313

(22) Filed: Jan. 20, 2022

(65) Prior Publication Data

US 2022/0239838 A1 Jul. 28, 2022

(30) Foreign Application Priority Data

Jan. 25, 2021 (JP) ................... 2021-009865

(51) Int. Cl.
*H04N 5/232* (2006.01)
*H04N 5/225* (2006.01)
*H04N 23/695* (2023.01)
*H04N 23/54* (2023.01)
*H04N 23/55* (2023.01)

(52) U.S. Cl.
CPC ........... *H04N 23/695* (2023.01); *H04N 23/54* (2023.01); *H04N 23/55* (2023.01)

(58) Field of Classification Search
CPC .. H04N 5/2253; H04N 5/2254; H04N 5/2259; H04N 5/23241; H04N 5/23299
See application file for complete search history.

(56) References Cited

U.S. PATENT DOCUMENTS

| | | | |
|---|---|---|---|
| 10,425,569 B2 * | 9/2019 | Teich | H04N 23/631 |
| 2009/0207250 A1 * | 8/2009 | Bennett | H04N 23/695 |
| | | | 348/E5.025 |
| 2017/0163899 A1 * | 6/2017 | Irie | H04N 23/632 |
| 2021/0149439 A1 * | 5/2021 | Tsai | G06F 1/1605 |

FOREIGN PATENT DOCUMENTS

JP 11-84211 A 3/1999

* cited by examiner

*Primary Examiner* — William C Vaughn, Jr.
*Assistant Examiner* — Naod W Belai
(74) *Attorney, Agent, or Firm* — Cowan, Liebowitz & Latman, P.C.

(57) ABSTRACT

A control apparatus controls an image capturing apparatus comprising an image capturing unit and a driving unit configured to change a direction of the image capturing unit. The control apparatus comprises an obtaining unit configured to obtain status information concerning an installation status of the image capturing apparatus; and a control unit configured to control, prior to power-off of the image capturing apparatus, the driving unit such that the direction of the image capturing unit is set in a predetermined direction determined based on the status information.

11 Claims, 8 Drawing Sheets

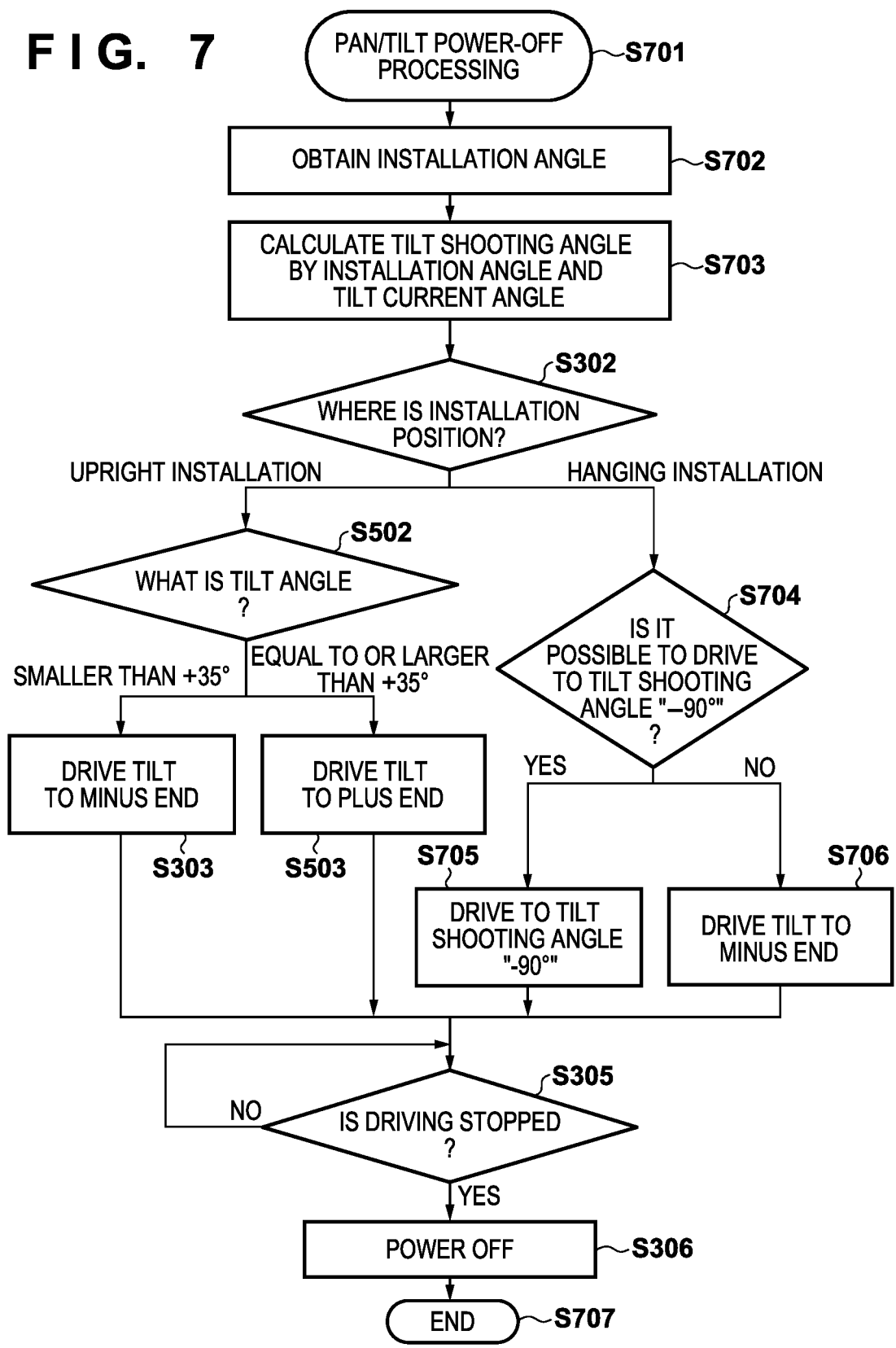

BEFORE POWER-OFF

TILT ANGLE : −15°
SHOOTING ANGLE : 0°

POWER-OFF AFTER DRIVING

TILT ANGLE : −100°
SHOOTING ANGLE : −85°

BEFORE POWER-OFF

TILT ANGLE : 15°
SHOOTING ANGLE : 0°

POWER-OFF AFTER DRIVING

TILT ANGLE : −75°
SHOOTING ANGLE : −90°

CONTROL APPARATUS AND CONTROL METHOD OF THE SAME

BACKGROUND OF THE INVENTION

Field of the Invention

The present invention relates to a technique of controlling the direction of a camera.

Description of the Related Art

Conventionally, there is known a pan/tilt (PT) camera that can be controlled via a network, a dedicated line, a remote controller, or the like to view a video. The PT camera includes a mechanism that can rotate in the pan direction (horizontal direction) and the tilt direction (vertical direction), and the shooting direction can be freely changed by a user operation.

The position (orientation, direction) of each of a pan driving unit for driving in the pan direction and a tilt driving unit for driving in the tilt direction can be maintained by energizing its motor when the power is turned on. When the power is turned off, the motor of the driving unit is not energized, so the position of the driving unit cannot be maintained. Therefore, if the holding position of a lens barrel (camera) is not the gravity center position of the lens barrel, the orientation (direction) of the lens barrel cannot be maintained when the power is turned off and, for example, the lens barrel may point vertically downward (in a gravity direction). As a result, the driving mechanism may be deteriorated by the lens barrel reaching the end of the movement range of the driving mechanism, or the quality may be degraded due to a collision sound or the like.

In addition, if a focus lens and a zoom lens inside the camera are not held when the power is turned off, the positions of these lenses may be shifted due to vibration or impact. This may cause rattling or the like in the lens driving mechanism, and the image capturing performance may be degraded. To prevent this, Japanese Patent Laid-Open No. H11-84211 (patent literature 1) proposes a method in which the power is turned off after driving each of the focus lens and the zoom lens to a predetermined position where they can withstand vibration and impact.

By using the technique proposed in patent literature 1, for example, by turning off the power after driving the tilt driving unit in the PT camera to the minimum position (minus end) of the movement range, it is possible to reduce deterioration of the driving mechanism.

However, with the technique proposed in patent literature 1, since the driving unit is driven to the same predetermined position regardless of the status of the PT camera, it may take a long time until power-off. For example, if the position of the tilt driving unit before power-off is near the maximum position (plus end) of the movement range, since the power is turned off after driving the tilt driving unit to the minus end, the driving distance is long and a long time is required until power-off. In addition, if the minus end of the tilt driving unit does not match the vertically downward direction, the lens barrel swings due to the gravity w % ben the power is turned off, and this causes a degradation in quality.

SUMMARY OF THE INVENTION

According to one aspect of the present invention, a control apparatus that controls an image capturing apparatus comprising an image capturing unit and a driving unit configured to change a direction of the image capturing unit, the control apparatus comprises: an obtaining unit configured to obtain status information concerning an installation status of the image capturing apparatus; and a control unit configured to control, prior to power-off of the image capturing apparatus, the driving unit such that the direction of the image capturing unit is set in a predetermined direction determined based on the status information.

The present invention enables holding of a camera in a more stable direction (orientation) status during a power-off period.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a flowchart illustrating the power-off processing of a PT camera in the third embodiment.

DESCRIPTION OF THE EMBODIMENTS

Figure 1:
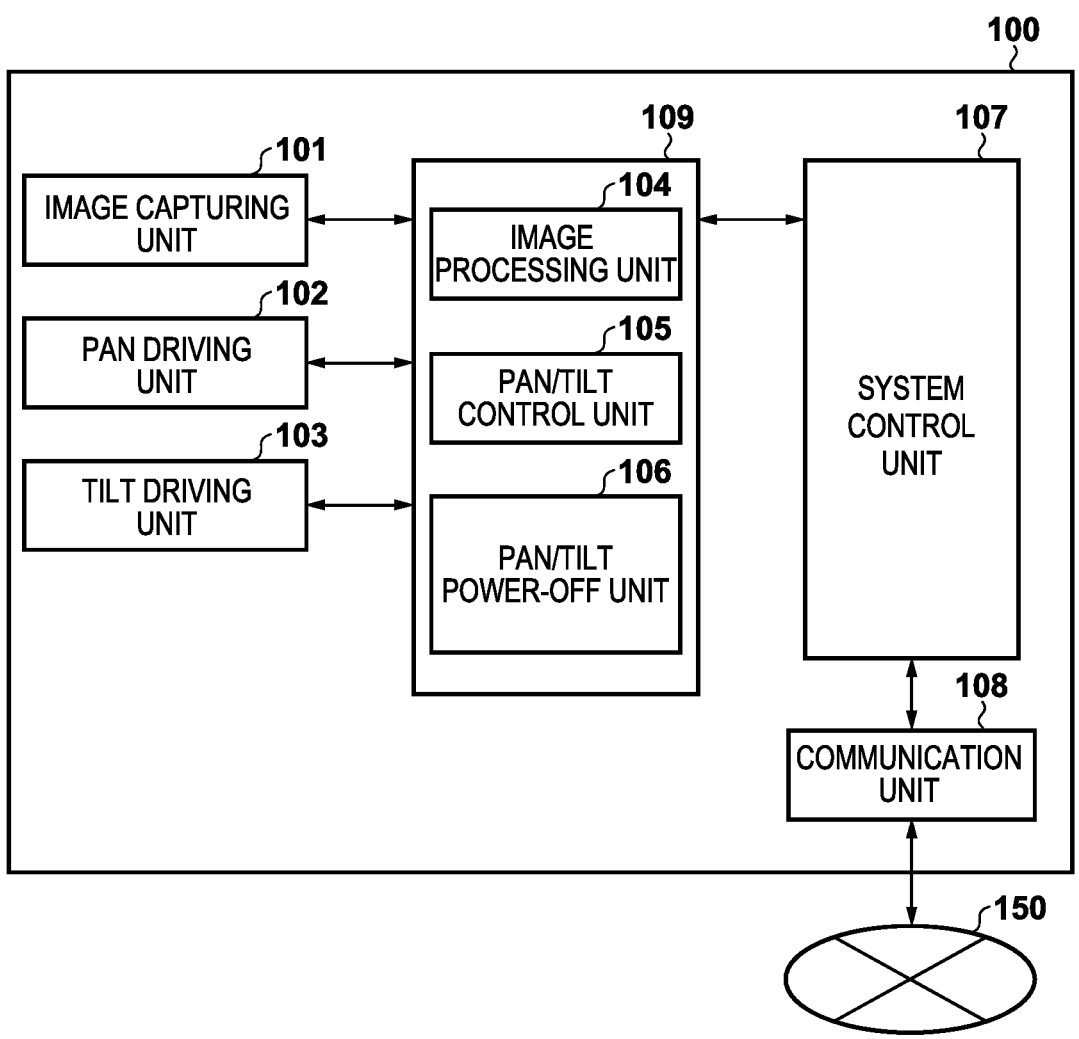
FIG. 1 is a block diagram showing the functional blocks of a PT camera.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

As the first embodiment of a control apparatus according to the present invention, control in a pan/tilt (PT) camera performed at the time of power-off will be described as an example.

<Arrangement of Apparatus>

FIG. 1 is a block diagram showing the functional blocks of a PT camera 100. The PT camera 100 is connected to a client apparatus (information processing apparatus) (not shown) via a network 150 so that they can communicate with each other. A user can transmit various camera control commands to the PT camera 100 via the client apparatus.

The PT camera 100 includes an image capturing unit 101, a pan driving unit 102, a tilt driving unit 103, a processing control unit 109 (including an image processing unit 104, a PT control unit 105, and a PT power-off unit 106), a system control unit 107, and a communication unit 108.

The image capturing unit 101 is formed from lenses for image capturing including a focus lens, a zoom lens, and the like, an image sensor, and a mechanism driving system and circuits for driving the above-described components. An object image is formed on the image sensor by the lenses for image capturing, and the image sensor generates an electrical signal representing the object image.

The pan driving unit 102 is formed from a mechanism driving system for performing a pan operation, a motor serving as a driving source, a motor driver, and the like, and controlled by the PT control unit 105. The detailed arrangement of the pan driving unit 102 will be described later using FIGS. 2A to 2C. The tilt driving unit 103 is formed from a mechanism driving system for performing a tilt operation, a motor serving as a driving source, a motor driver, and the like, and controlled by the PT control unit 105. The detailed arrangement of the tilt driving unit 103 will be described later using FIGS. 2A to 2C.

The image processing unit 104 performs image processing such as noise removal and gamma correction on the electrical signal generated by the image capturing unit 101 to generate image data, and transmits it to the system control unit 107. Further, the image processing unit 104 processes an instruction related to the image capturing unit 101 received from the system control unit 107. For example, if an instruction to perform image quality adjustment is received from the system control unit 107, the image processing unit 104 performs the image quality arrangement. If an instruction to change the zoom position or the focus position is received form the system control unit 107, the image processing unit 104 controls the image capturing unit 101 such that the focus lens or the zoom lens is set to the received position.

The PT control unit 105 processes an instruction for PT control received from the system control unit 107. For example, based on the instruction received from the system control unit 107, the PT control unit 105 controls the driving amount, velocity, or acceleration of each of the pan driving unit 102 and the tilt driving unit 103, and performs an initialization operation or the like.

The PT power-off unit 106 performs power-off processing of each of the pan driving unit 102 and the tilt driving unit 103. If a power-off instruction is received from the system control unit 107, the PT power-off unit 106 instructs the PT control unit 105 to drive each of the pan driving unit 102 and the tilt driving unit 103 to a predetermined position. Then, after driving of each driving unit to the predetermined position is completed, the PT power-off unit 106 confirms that the pan driving unit 102 and the tilt driving unit 103 have stopped and, thereafter, stops energization of the pan driving unit 102 and the tilt driving unit 103. The details of the predetermined positions will be described later.

The system control unit 107 controls the entire PT camera 100. The system control unit 107 distributes the image data generated by the image processing unit 104 to the client apparatus (not shown) via the communication unit 108. Further, the system control unit 107 analyzes a camera control command transmitted from the client apparatus (not shown) via the communication unit 108, and transmits the instruction obtained as the analysis result to each unit in the processing control unit 109. For example, the instruction related to image processing or the image capturing unit 101 is transmitted to the image processing unit 104, and the instruction for PT control is transmitted to the PT control unit 105. Further, if a transition command to a stand-by status is received, the system control unit 107 transmits an instruction to enter the stand-by status to the processing control unit 109. If a return command from the stand-by status is received, the system control unit 107 transmits a return instruction to the processing control unit 109.

The communication unit 108 receives a camera control command transmitted from the client apparatus, and transfers it to the system control unit 107. Further, the communication unit 108 transmits, to the client apparatus (not shown), the image data generated by the image processing unit 104 and a response to the camera control command.

Note that the PT camera 100 in this embodiment is not limited to the arrangement shown in FIG. 1. For example, the PT camera 100 may be provided with a video output terminal such as an SDI (Serial Digital Interface) or an HDMI (High-Definition Multimedia Interface)®, an audio input/output unit, or an external device input/output unit. The communication unit 108 may be connected by wired connection or wireless connection. The communication unit 108 may be connected not to the network 150 but to another equipment by serial communication or the like.

Figure 2A:
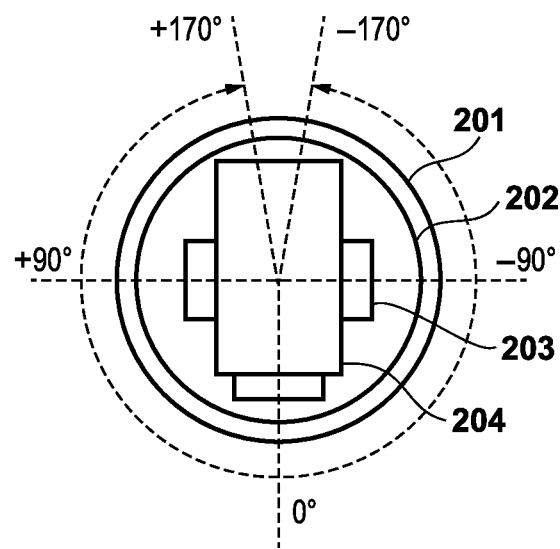
FIGS. 2A to 2C are views each for explaining the movement range of the PT camera.
Figure 2B:
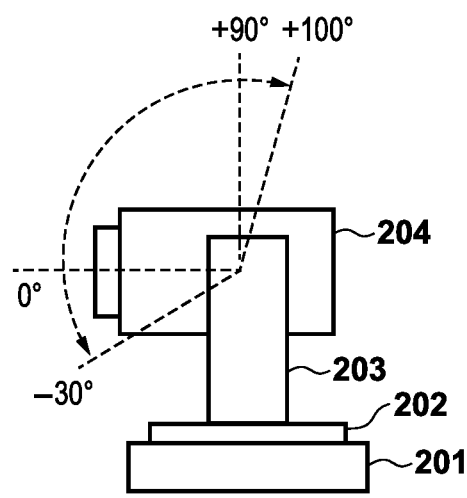
Figure 2C:
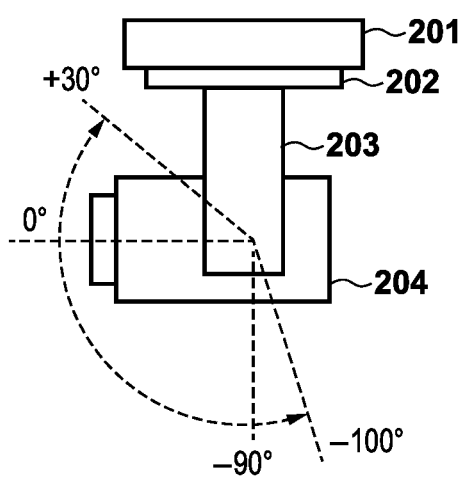

FIGS. 2A to 2C are views each for explaining the movement range of the PT camera 100. The PT camera 100 can be installed "upright" or "by hanging from ceiling".

FIG. 2A is a view of the attached PT camera 100 when viewed from the top (atilt angle of "+90°") direction. FIG. 2B is a view of the PT camera 100 installed upright when viewed from the side, and FIG. 2C is a view of the PT camera 100 installed by hanging from ceiling when viewed from the side. In FIGS. 2A to 2C, the PT camera 100 is formed from a bottom case 201, a turn table 202, a camera head support 203, and a camera head 204. In this embodiment, a case will be described in which the camera head support 203 supports the camera head 204 at the position behind the gravity center position of the camera head 204.

In the following description, an operation of the PT movable unit will be described while defining the axis of the PT camera 100 in the vertical direction as a vertical axis and the axis orthogonal to the vertical axis as a horizontal axis. Note that in FIG. 2A, with the vertical axis orthogonal to the paper surface as the center, the clockwise direction is the positive (plus) direction of the pan angle, and the counterclockwise direction is the negative (minus) direction of the pan angle. Further, in FIGS. 2B and 2C, with the axis orthogonal to the paper surface as the center, the clockwise direction is the positive direction of the tilt angle, and the counterclockwise direction is the negative direction of the tilt angle.

The pan driving unit 102 is formed from the bottom case 201 and the turn table 202, and the turn table 202 rotates in the horizontal direction with the vertical axis as the center. The pan driving unit 102 in this embodiment can rotate from "−170°" to "+170°" in the pan direction with a given reference direction (0°) as the center.

The tilt driving unit 103 is formed from the camera head support 203 and the camera head 204 provided on the turn table 202, and the camera head 204 rotates in the vertical direction with the horizontal axis as the center. As has been described above, the PT camera 100 can be installed upright or installed by hanging from ceiling. In the upright installation as shown in FIG. 2B, the tilt driving unit 103 in this embodiment can rotate from "−30°" in the diagonally downward direction to "+0°" in the diagonally upward direction with the horizontal direction (0°) as the reference. In the hanging installation as shown in FIG. 2C, the tilt driving unit 103 can rotate from "−100°" in the diagonally downward direction to "+30°" in the diagonally upward direction.

Each of the angles shown in FIGS. 2A to 2C indicates the angle which the user can give to the PT camera 100. The PT control unit 105 gives a driving instruction to the pan driving unit 102 or the tilt driving unit 103 while using the angles shown in FIGS. 2A to 2C as the references. For example, if the user instructs to drive the tilt driving unit to the upward "+30°" position in the hanging installation shown in FIG. 2C, the PT control unit 105 internally inverts the sign of the driving amount, and instructs the tilt driving unit 103 to drive to the "−30°" position. With this, it is possible to drive the tilt driving unit 103 to the tilt end position (the "−30°" position in FIG. 2B) in both cases of the upright installation and the hanging installation.

As has been described above, the PT camera 100 of this embodiment can change the shooting direction by rotating the direction (orientation) of the camera head 204 in the pan direction and the tilt direction, so that it can shoot a wide range. Note that the PT camera 100 is not limited to the arrangement shown in FIGS. 2A to 2C. For example, the PT camera 100 may be capable of 360° (endless) driving in the pan direction and/or the tilt direction.

If the camera head support 203 supports the camera head 204 at the gravity center position of the camera head 204, the camera head 204 can maintain its horizontal position even when the tilt driving unit 103 is powered off. However, if the camera head support 203 supports the camera head 204 at the position behind the gravity center position of the camera head 204, when the tilt driving unit 103 is powered off, the front portion of the camera head 204 is lowered due to the effect of gravity.

For example, in the upright installation, the front portion of the camera head 204 is lowered to the minus end (the "−30°" position in FIG. 2B). In the hanging installation, the front portion of the camera head 204 is lowered to the vertically downward direction (the "−90°" position in FIG. 2C) which is the gravity direction.

<Operation of Apparatus>

Figure 3:
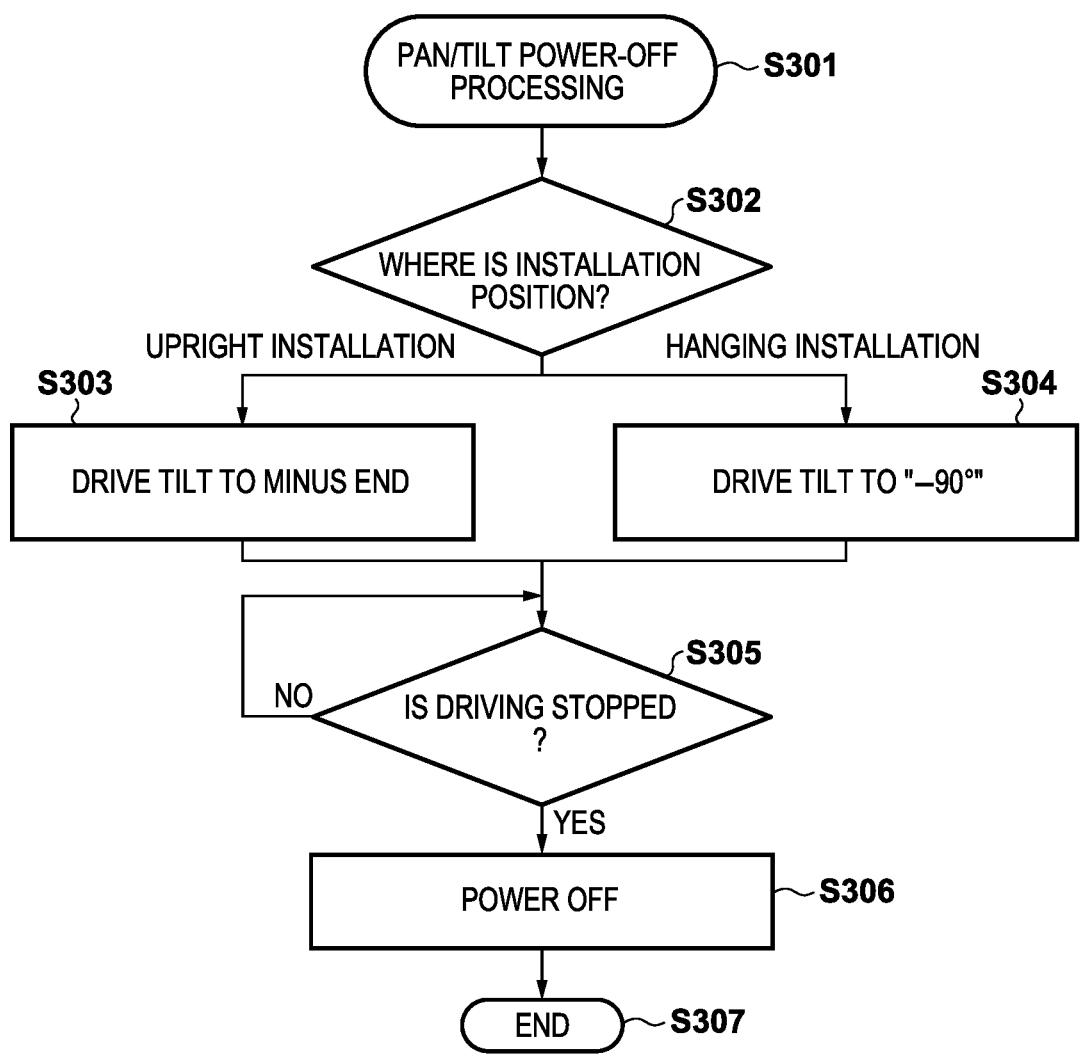
FIG. 3 is a flowchart illustrating the power-off processing of the PT camera in the first embodiment.
Figure 4A:
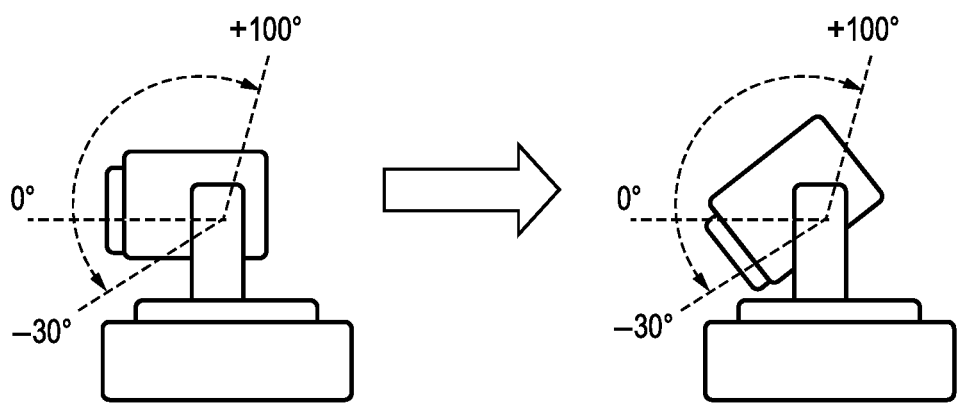
FIGS. 4A and 4B are views each for explaining the change of the direction (orientation) of the PT camera before and after power-off in the first embodiment.
Figure 4B:
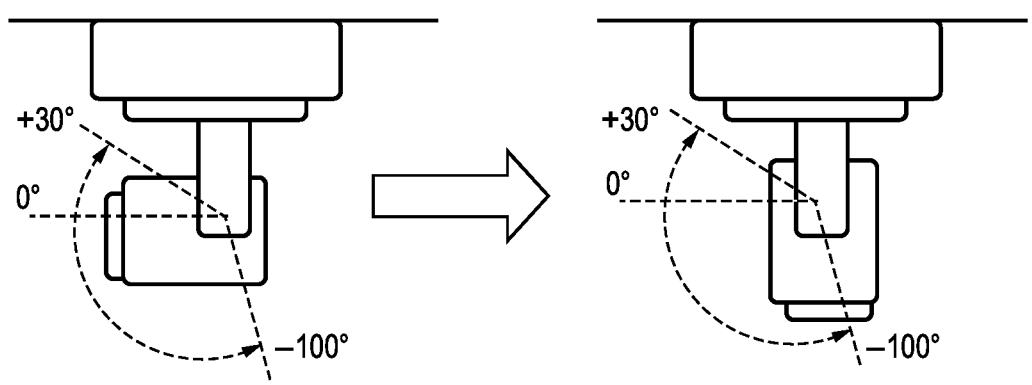

FIG. 3 is a flowchart illustrating the power-off processing of the PT camera in the first embodiment. FIGS. 4A and 4B are views each for explaining the change of the direction (orientation) of the PT camera before and after power-off in the first embodiment. The power-off processing of the PT camera is performed by the PT power-off unit 106.

In step S301, the PT power-off unit 106 starts the sequence of the flowchart. For example, if it is determined by the system control unit 107 that power-off is required, the sequence of the flowchart is started. For example, when switching the video output method in the image processing unit 104 or when updating the firmware of the processing control unit 109, the sequence is invoked. Switching of the video output method is, for example, switching between NTSC (National Television System Committee) and PAL (Phase Alternation Line).

In step S302, the PT power-off unit 106 obtains the status information concerning the installation status of the PT camera 100. In this embodiment, it is assumed that when installing the PT camera 100, the user sets either "upright installation" or "hanging installation" in advance, and the PT power-off unit 106 obtains the status information by obtaining the set value. Note that, for example, if an acceleration sensor is mounted on the PT camera 100, the installation status (orientation, direction) may be determined from the value of the acceleration sensor. If the obtained information indicates "upright installation", the process advances to step S303. If the obtained information indicates "hanging installation", the process advances to step S304.

In step S303, the PT power-off unit 106 transmits a command to the PT control unit 105 to drive the tilt driving unit 103 to the minus end (here, "−30°").

FIG. 4A shows the change before and after power-off in the upright installation. Here, before step S303 is performed, the tilt driving unit 103 is at the "0°" position. As has been described above, if the pan driving unit 102 and the tilt driving unit 103 are powered off in this state, the front portion of the camera head 204 is lowered to the "−30°" position due to the effect of gravity, and collides with the end of the mechanism of the tilt driving unit 103. Therefore, by powering off the tilt driving unit 103 after driving it to the "−30°" position, which is the lower end of the tilt movement range, in advance, occurrence of the collision at the time of power-off can be minimized.

In step S304, the PT power-off unit 106 transmits a command to the PT control unit 105 to drive the tilt driving unit 103 to the vertically downward direction ("−90°").

FIG. 4B shows the change before and after power-off in the hanging installation. Here, before step S304 is performed, the tilt driving unit 103 is at the "0°" position. As has been described above, if the pan driving unit 102 and the tilt driving unit 103 are powered off in this state, the front portion of the camera head 204 is lowered to the "−90°" position due to the effect of gravity, and it unsteadily swings. Therefore, by powering off the tilt driving unit 103 after driving it to the "−90°" position in advance, the camera head 204 can be prevented from swinging at the time of power-off.

In step S305, the PT power-off unit 106 checks whether the tilt driving unit 103 driven in step S303 or S304 has stopped. The stop of driving may be checked by obtaining a value from an encoder if the encoder is mounted, or may be checked by obtaining a value of the motor driver. If it is determined that the tilt driving unit 103 has stopped, the process advances to step S306. If it is determined that the tilt driving unit 103 has not stopped, step S305 is repeated until it is determined that the tilt driving unit 103 has stopped.

In step S306, the PT power-off unit 106 powers off the pan driving unit 102 and the tilt driving unit 103. Note that by powering off the pan driving unit 102 and the tilt driving unit 103, the motor of each driving unit is also set in the non-energized state. If the processing in step S303 or S304 is not performed, it is generally impossible to hold the camera head 204 at the current position. However, by performing the processing in step S303 or S304 to move the camera head 204 to the predetermined position in advance, it becomes possible to stabilize the direction (orientation) of the camera head 204 after power-off.

In step S307, the PT power-off unit 106 terminates the sequence of the PT power-off unit 106 in this embodiment.

As has been described above, according to the first embodiment, prior to power-off of the PT camera 100, the camera head 204 is driven to a predetermined direction (orientation). At this time, in accordance with the installation form (upright installation or hanging installation) of the PT camera 100, the predetermined position serving as the driving target of the tilt driving unit 103 is changed. By powering off the pan driving unit 102 and the tilt driving unit 103 after driving the tilt driving unit 103 to the predetermined position, it becomes possible to hold the camera head 204 in a more suitable status during the power-off period. That is, in the upright installation, the camera head 204 can be prevented from colliding with the end of the mechanism, so that deterioration of the mechanism can be reduced.

Further, in the hanging installation, the camera head 204 can be prevented from unsteadily swinging, so that the quality improving effect can be obtained.

Note that in the above description, the description has been provided regarding the tilt driving unit 103, but a similar operation may be performed for the pan driving unit 102. For example, when installing the PT camera 100 on a wall surface, by performing, also on the pan driving unit 102, the control described above regarding the tilt driving unit 103, it becomes possible to hold the camera head 204 in a more suitable status during the power-off period.

Alternatively, for example, the pan driving unit 102 may be powered off after driving it to the plus end ("+170°") which is one end of the pan movement range. With this, it becomes possible to shorten the time required to initialize the pan driving unit 102. That is, if a sensor (for example, a photointerrupter or the like) for reference positioning is installed near the plus end, it is possible to perform the reference positioning more quickly during initialization at the time of next activation.

Second Embodiment

In the second embodiment, an arrangement will be described in which the predetermined position is changed further based on the angle of a tilt driving unit 103 before power-off. The functional blocks of the PT camera and the movement range of the PT camera are similar to those in the first embodiment, and the description thereof will be omitted. Differences from the first embodiment will mainly be described below.

<Operation of Apparatus>

Figure 5:
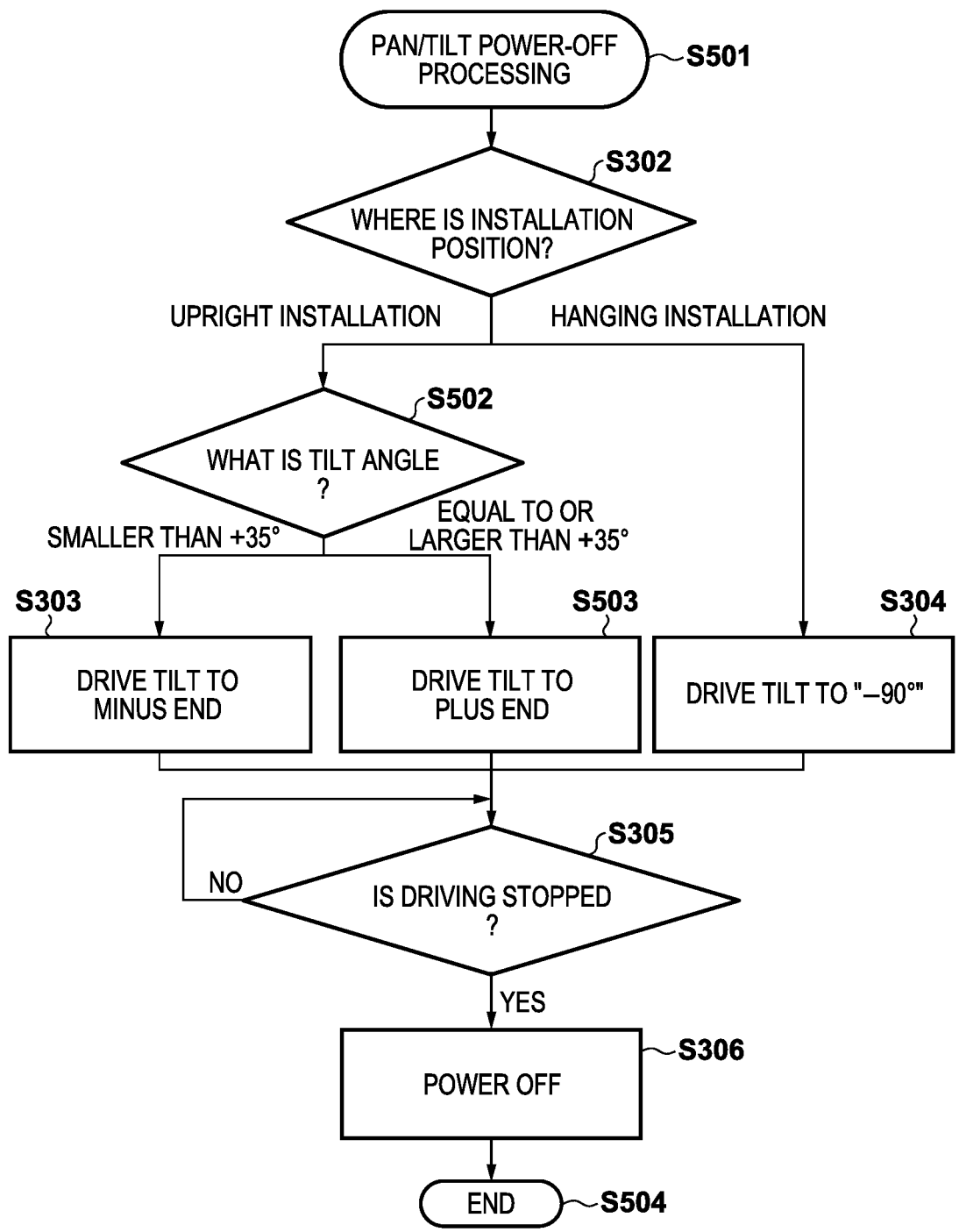
FIG. 5 is a flowchart illustrating the power-off processing of a PT camera in the second embodiment.
Figure 6:
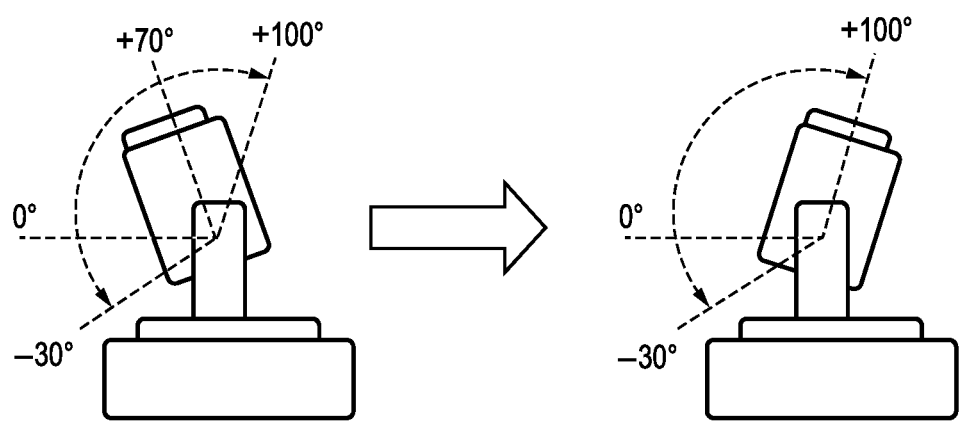
FIG. 6 is a view for explaining the change of the direction (orientation) of the PT camera before and after power-off in the second embodiment.

FIG. 5 is a flowchart illustrating the power-off processing of the PT camera in the second embodiment. FIG. 6 is a view for explaining the change of the direction (orientation) of the PT camera before and after power-off in the second embodiment. Note that steps similar to those in FIG. 3 are denoted by the same step numbers as in FIG. 3, and the description thereof will be omitted.

In step S501, a PT power-off unit 106 starts the sequence of the flowchart. Then, if it is determined in step S302 that the installation position is "upright", the process advances to step S502.

In step S502, the PT power-off unit 106 obtains the current angle of the tilt driving unit 103 and compares it with a threshold value. The threshold value is set to the central angle of the movement range of the tilt driving unit 103. For example, in this embodiment, the tilt driving unit 103 can drive from "−30°" to "+100". Accordingly, the central angle of the movement range can be calculated by (100−(−30))÷2+(−30)=+35, and the threshold value is set to "+35°". Note that the current angle is compared with the threshold value to check whether the current angle is located above or below the central angle. Here, it is assumed that the current angle is obtained from the motor step count of the tilt driving unit 103 which is internally managed by a PT control unit 105. However, if an encoder is mounted, the current angle may be directly obtained from the encoder. If the obtained current angle is smaller than the threshold value ("+35°"), the process advances to step S303. If the obtained current angle is equal to or larger than the threshold value, the process advances to step S503.

In step S503, since it is determined in step S502 that the current angle is located above the central angle serving as the threshold value, the PT power-off unit 106 drives the tilt driving unit 103 to the "+100°" position which is the plus end of the tile driving unit 103.

As shown in FIG. 6, if the current angle of the tilt driving unit before power-off is "+70°", it is necessary to drive the tilt driving unit by about 100° in the minus direction to drive it to the position of the minus end. On the other hand, in order to drive the tilt driving unit to the plus end, it is only required to drive it by about 30° in the plus direction. That is, since the driving amount of driving to the plus end is smaller than that of driving to the minus end, the driving time is shortened and the time required until power-off can be also shortened. Further, if the tilt driving unit is driven to the plus end, it is supported at the plus end of the driving mechanism even after power-off, so that it becomes possible to stabilize the direction (orientation) of a camera head 204 after power-off.

In step S504, the PT power-off unit 106 terminates the sequence of the PT power-off unit 106 in this embodiment.

As has been described above, according to the second embodiment, prior to power-off of the PT camera 100, the camera head 204 is driven to a predetermined direction (orientation). At this time, in accordance with the current angle of the tilt driving unit, the predetermined position serving as the driving target of the tilt driving unit 103 is changed. More specifically, in accordance with the current angle of the tilt driving unit, the predetermined position with a less driving amount is determined. By controlling in this manner, it becomes possible to hold the camera head 204 in a more suitable status during the power-off period as in the first embodiment, and it further becomes possible to shorten the time required until power-off.

Third Embodiment

In the third embodiment, a case will be described in which a PT camera 100 is installed not in a horizontal place but in an inclined place. The functional blocks of the PT camera and the movement range of the PT camera are similar to those in the first embodiment, and the description thereof will be omitted. Differences from the first embodiment and the second embodiment will mainly be described below.

<Operation of Apparatus>

Figure 8A:
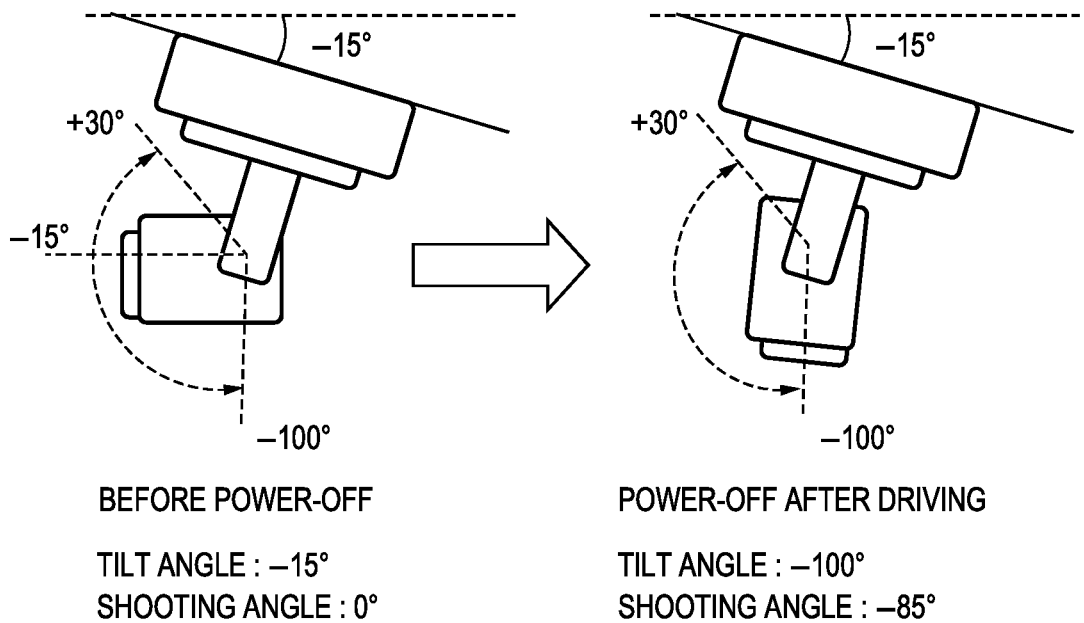
FIGS. 8A and 8B are views each for explaining the change of the direction (orientation) of the PT camera before and after power-off in the third embodiment.
Figure 8B:
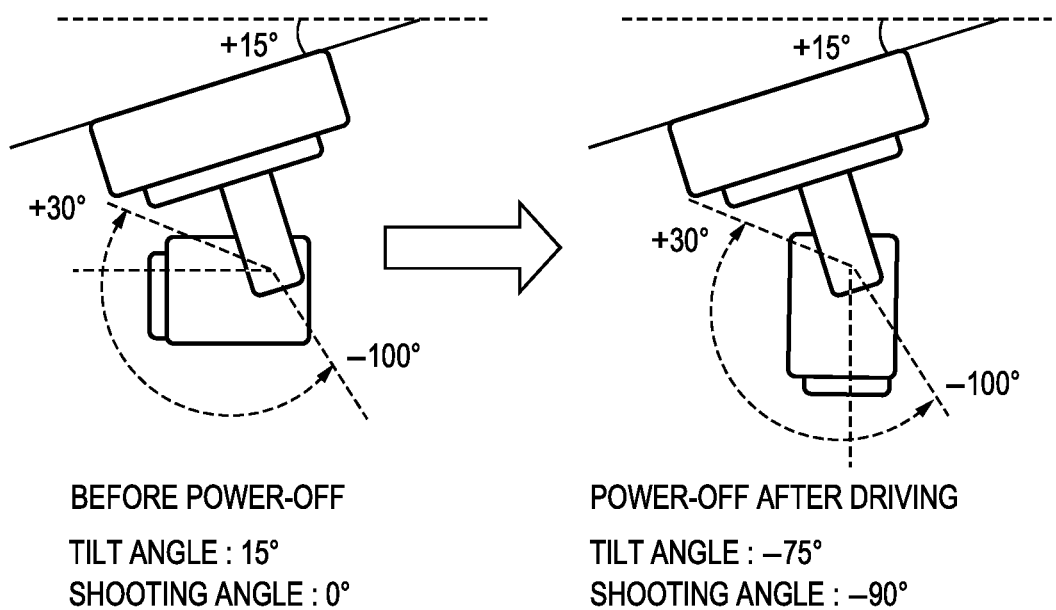

FIG. 7 is a flowchart illustrating the power-off processing of the PT camera in the third embodiment. FIGS. 8A and 8B are views each for explaining the change of the direction (orientation) of the PT camera before and after power-off in the third embodiment.

In step S701, a PT power-off unit 106 starts the sequence of the flowchart. In step S702, the PT power-off unit 106 obtains the installation angle of the PT camera 100. Here, the installation angle is the angle indicating the inclination, from the horizontal plane, of the place where the PT camera 100 is installed. The installation angle may be set by a user setting an angle value in the PT camera 100, or may be calculated from an output of an acceleration sensor if the acceleration sensor is mounted. After obtaining the installation angle, the process advances to step S703. Note that instead of obtaining the installation angle in the flowchart of FIG. 7, the installation angle may be obtained w % ben the PT camera 100 is activated or when the user sets the angle value.

In step S703, based on the installation angle obtained in step S702 and the current angle of a tilt driving unit 103, the PT power-off unit 106 obtains the shooting angle of a camera head 204. Here, the shooting angle is the angle indicating the tilt direction with the horizontal plane as the reference (0°).

For example, in a case in which the ceiling is inclined (the installation angle is "−15°") and the current angle of tilt is "−15°" as shown in FIG. 8A, by calculating shooting angle=current angle−installation angle, the shooting angle is found to be "0°". In a case in which the ceiling is inclined (the installation angle is "+15°") and the current angle of tilt is "+15°" as shown in FIG. 8B, by calculating shooting angle=current angle−installation angle, the shooting angle is found to be "0°".

In step S704, the PT power-off unit 106 determines whether it is possible to drive the tilt driving unit 103 until the shooting angle becomes "−90°" (that is, the vertically downward). The tilt angle can be obtained by calculating "shooting angle+installation angle". If it is determined that the driving is possible (for example, FIG. 8B), the process advances to step S705. If it is determined that the driving is impossible (for example, FIG. 8A), the process advances to step S706.

For example, if the installation angle is "−15°" as shown in FIG. 8A, the tilt angle to make the shooting angle "−90°" can be calculated to be "−105°". However, as has been described above, since the movement range of the tilt driving unit 103 in this embodiment is from "−100°" to "+30°" in the hanging installation, the tilt driving unit 103 cannot be driven to the tilt angle of "−105°". Accordingly, the PT power-off unit 106 determines that it is impossible to drive the tilt driving unit 103 until the shooting angle becomes "−90°".

On the other hand, if the installation angle is "+15°" as shown in FIG. 8B, the tilt angle to make the shooting angle "−90°" can be calculated to be "−75°". Accordingly, the PT power-off unit 106 determines that it is possible to drive the tilt driving unit 103 until the shooting angle becomes "−90°".

In step S705, the PT power-off unit 106 drives the tilt driving unit 103 to the tilt angle (here, "−75°") with which the shooting angle becomes "−90°".

In step S706, the PT power-off unit 106 drives the tilt driving unit 103 to the minus end (here, the tilt angle of "−100°") of the tilt driving unit 103. This is because at the minus end of the tilt driving unit 103, the direction (orientation) of the camera head 204 after power-off can be stabilized. Note that the shooting angle at this time is "−85°".

In step S707, the PT power-off unit 106 terminates the sequence of the PT power-off unit 106 in this embodiment.

As has been described above, according to the third embodiment, prior to power-off of the PT camera 100, the camera head 204 is driven to a predetermined direction (orientation). At this time, based on the installation angle (the inclination of the installation place from the horizontal plane) of the PT camera 100 and the movement range of the tilt driving unit 103, the predetermined position of the camera head 204 is changed. By controlling in this manner, it becomes possible to hold the camera head 204 in a more suitable status during the power-off period, and it becomes possible to suitably determine the position within the movement range of the tilt driving unit 103.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-009865, filed Jan. 25, 2021 which is hereby incorporated by reference herein in its entirety.

What is claimed is:

1. A control apparatus that controls an image capturing apparatus comprising an image capturing unit, a driving unit configured to change a direction of the image capturing unit and a tilt driving unit that drives the image capturing unit in a tilt direction, the control apparatus comprising:

an obtaining unit configured to obtain status information concerning an installation status of the image capturing apparatus; and a control unit configured to, if it is determined that power off of the image capturing apparatus is required, control the driving unit such that the direction of the image capturing unit is set in a predetermined direction determined based on the status information indicating whether the image capturing apparatus is installed upright or installed by hanging from ceiling, and performing power off of the image capturing apparatus after the direction of the image capturing unit is set in the predetermined direction, wherein, if the status information indicates that the image capturing apparatus is installed by hanging from ceiling, the predetermined direction is a direction in which the direction of the image capturing unit is vertically downward, and if the status information indicates that the image capturing apparatus is installed upright, the control unit compares a current angle of the tilt driving unit with a threshold value, and determines that (a) the predetermined direction is a first direction determined by one end of a tilt movement range of the tilt driving unit if the current angle of the tilt driving unit is smaller than the threshold value, and (b) the predetermined direction is a second direction determined by the other end of the tilt movement range of the tilt driving unit and is different from the first direction if a current angle of the tilt driving unit is equal to or larger than the threshold value.

2. The apparatus according to claim 1, wherein the predetermined direction is a direction in which the direction of the image capturing unit is stable with respect to gravity.

3. The apparatus according to claim 1, wherein the predetermined direction is a direction within a movement range of the driving unit.

4. The apparatus according to claim 1, wherein the driving unit further includes
a pan driving unit that drives the image capturing unit in a pan direction.

5. The apparatus according to claim 1, wherein
the predetermined direction is further a direction determined by one end of a pan movement range of the pan driving unit.

6. The apparatus according to claim 1, wherein
the status information further includes information of the current angle of the tilt driving unit.

7. The apparatus according to claim 1, wherein
if the status information indicates that the image capturing apparatus is installed by hanging from ceiling and it is impossible to drive the tilt driving unit to a given tilt angle which makes the direction of the image capturing unit vertically downward, the predetermined direction is a direction determined by one end of the tilt movement range of the tilt driving unit which has a smaller difference from the given tilt angle than the other one.

8. The apparatus according to claim 7, wherein
the status information further includes information of an installation angle indicating an inclination, from a horizontal plane, of a place where the image capturing apparatus is installed, and
based on the movement range of the tilt driving unit and the installation angle, it is determined whether the tilt driving unit can be driven to the given tilt angle.

9. The apparatus according to claim 1, wherein a possible directional range of the image capturing unit with respect to a direction of gravity is derived from the status information.

10. A control method of an image capturing apparatus comprising an image capturing unit, a driving unit configured to change a direction of the image capturing unit, and a tilt driving unit that drives the image capturing unit in a tilt direction, the method comprising:
obtaining status information concerning an installation status of the image capturing apparatus; and
controlling the driving unit such that, if it is determined that power off of the image capturing apparatus is required, the direction of the image capturing unit is set in a predetermined direction determined based on the status information, indicating whether the image capturing apparatus is installed upright or installed by hanging from ceiling, and performing power off of the image capturing apparatus after the direction of the image capturing unit is set in the predetermined direction,
wherein,
if the status information indicates that the image capturing apparatus is installed by hanging from ceiling, the predetermined direction is a direction in which the direction of the image capturing unit is vertically downward, and
if the status information indicates that the image capturing apparatus is installed upright, comparing a current angle of the tilt driving unit with a threshold value, and determining that (a) the predetermined direction is a first direction determined by one end of a tilt movement range of the tilt driving unit if the current angle of the tilt driving unit is smaller than the threshold value, and (b) the predetermined direction is a second direction determined by the other end of the tilt movement range of the tilt driving unit and is different from the first direction if a current angle of the tilt driving unit is equal to or larger than the threshold value.

11. A non-transitory computer-readable recording medium storing a program for causing a computer to execute a control method of an image capturing apparatus comprising:
an image capturing unit, a driving unit configured to change a direction of the image capturing unit, and a tilt driving unit that drives the image capturing unit in a tilt direction, the method comprising:
obtaining status information concerning an installation status of the image capturing apparatus; and
controlling the driving unit such that, if it is determined that power off of the image capturing apparatus is required, the direction of the image capturing unit is set in a predetermined direction determined based on the status information, indicating whether the image capturing apparatus is installed upright or installed by hanging from ceiling, and performing power off of the image capturing apparatus after the direction of the image capturing unit is set in the predetermined direction,
wherein,
if the status information indicates that the image capturing apparatus is installed by hanging from ceiling, the predetermined direction is a direction in which the direction of the image capturing unit is vertically downward, and
if the status information indicates that the image capturing apparatus is installed upright, comparing a current angle of the tilt driving unit with a threshold value, and determining that (a) the predetermined direction is a first direction determined by one end of a tilt movement range of the tilt driving unit if the current angle of the tilt driving unit is smaller than the threshold value, and (b) the predetermined direction is a second direction determined by the other end of the tilt movement range of the tilt driving unit and is different from the first direction if a current angle of the tilt driving unit is equal to or larger than the threshold value.

* * * * *